United States Patent Office 2,933,947
Patented Apr. 26, 1960

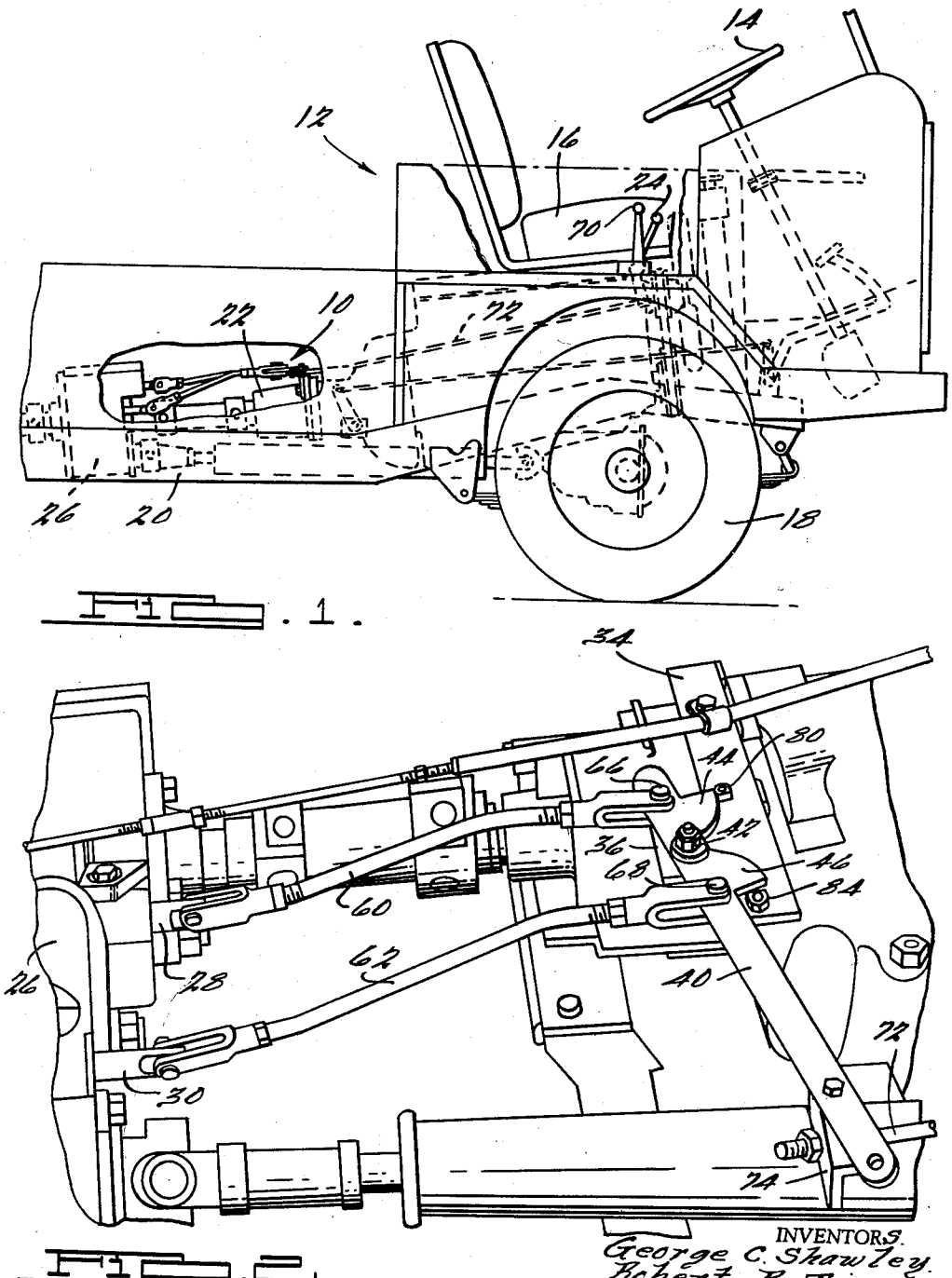

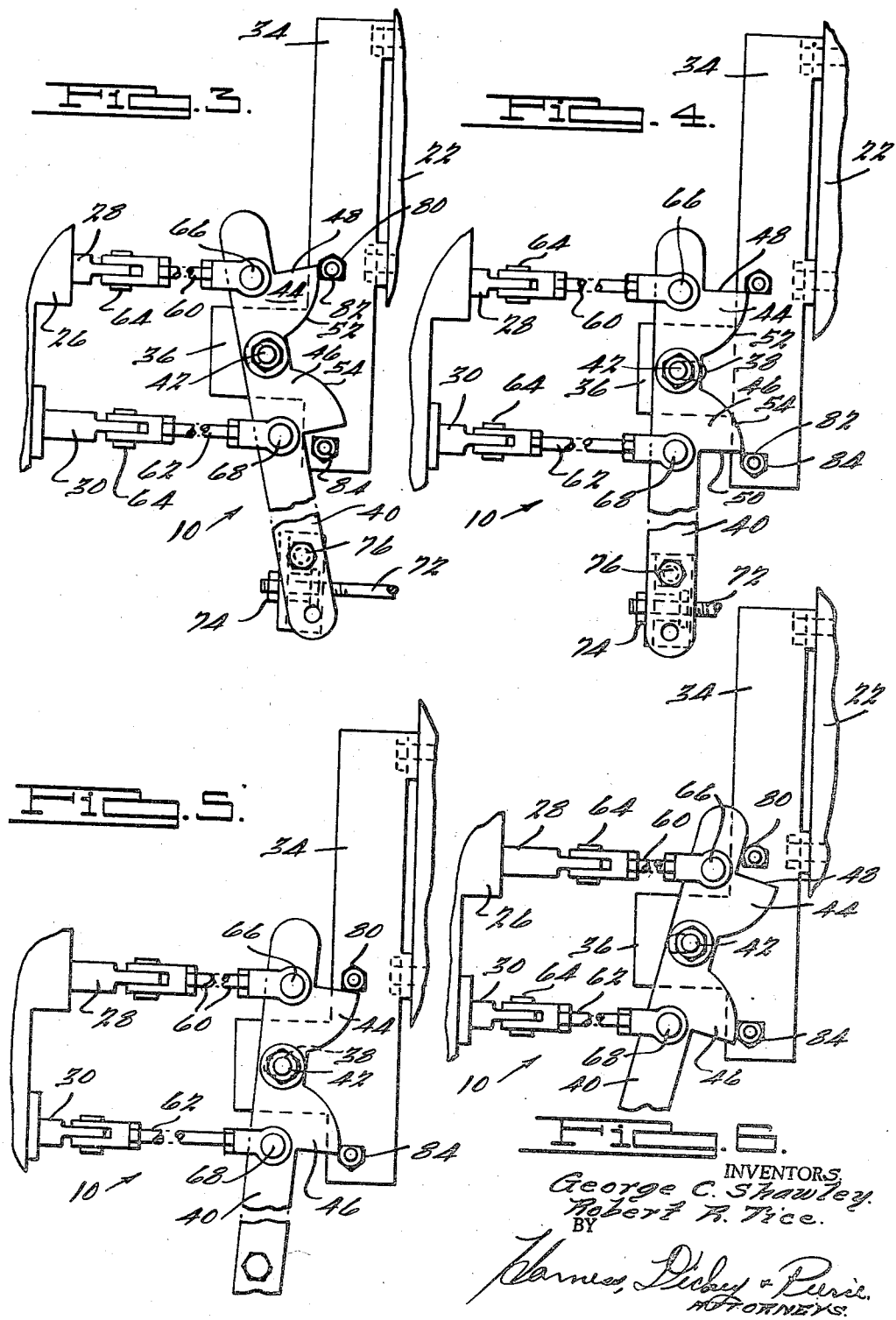

2,933,947

SINGLE LEVER CONTROL

George C. Shawley and Robert R. Tice, Toledo, Ohio, assignors, by mesne assignments, to Bank of America National Trust and Savings Association, a national banking association Application April 3, 1958, Serial No. 726,118

7 Claims. (Cl. 74—477)

This invention relates generally to automotive vehicles and more particularly to a single lever gear control apparatus for such vehicles.

Vehicles of certain types, such as those of military type, include a transmission and a transfer case having a gear mechanism for selectively providing a driving connection to the vehicle front wheels so that the vehicle can be put in either two or four wheel drive. In addition this gear mechanism provides further lower vehicle speeds not obtainable with the regular transmission mechanism. To avoid complicating the assembly and driving of the vehicle with too many control levers, a single lever is assembled with the transfer case such that pivoting of the lever is operable to move the gear mechanism to the different desired positions thereof.

The object of this invention, therefore, is to provide an improved single lever control apparatus for the transfer case in a vehicle of the above type.

Another object of the invention is to provide a single lever control apparatus which is simple in construction, economical to manufacture and readily operated by the vehicle driver to effect the desired gear actuation.

Further objects, features and advantages of this invention will become apparent from a consideration of the following description, the appended claims and the accompanying drawing in which:

Figure 1 is a side elevational view of the front end portion of a forward control type vehicle showing the single lever gear control apparatus of this invention mounted on the vehicle;

Fig. 2 is a fragmentary perspective view of a portion of the control apparatus of this invention; and Figs. 3, 4, 5 and 6 are plan views of a portion of the control apparatus of this invention illustrating successively moved positions of the control lever.

With reference to the drawing, the single lever control apparatus of this invention, indicated generally at 10, is illustrated in Fig. 1 in assembly relation with a forward control type vehicle 12 having a steering wheel 14, an operator's seat 16, and ground wheels 18, only one of which is illustrated, mounted on a main frame 20. The vehicle 10 includes a transmission housing 22 for the usual drive gear mechanism operable by a transmission shift lever 24 positioned adjacent the operator's seat 16.

Located rearwardly of the transmission housing 22 is a separate transfer case 26 for the usual gear mechanism which is operable to provide for a two or four wheel drive of the vehicle 10, as well as to provide for further lower vehicle speeds not obtainable with the regular transmission mechanism in the housing 22. The transfer case 26 supports a pair of control rods or members 28 and 30 which are arranged side by side and mounted in the transfer case 26 for reciprocal movement.

The rod 28 is movable axially between three positions, namely, an inner "high range" position illustrated in Figs. 2, 3 and 4, an intermediate "neutral" position shown in Fig. 5, and the outer "low range" position shown in Fig. 6. The terms "high range" and "low range" are used herein to indicate the speed ranges through which the vehicle 10 is operable by manipulation of the transmission shift lever 24.

The rod 30 is movable between the outer position shown in Figs. 2 and 3, which corresponds to a two-wheel drive of the vehicle, and the inner position shown in Figs. 4, 5 and 6, which corresponds to a four-wheel drive of the vehicle.

The control apparatus of this invention provides for the assembly of a single control lever with the rods 28 and 30 so that the rods are concurrently manipulated to place the gear mechanism in the transfer case 26 in the desired position, and includes a supporting plate 34 secured to the transmission housing 22 and extending transversely of the vehicle. The plate 34 has a rearwardly extending leg 36 provided with a slot 38 which extends longitudinally of the vehicle 12. A horizontal lever member 40 is connected intermediate its ends to the leg 36 by an upright pin 42 disposed in the slot 38. The slot 38 is of a size such that the pin 42 is readily movable longitudinally thereof and the pin is loosely assembled with the leg 36 so that movement of the pin in the slot 38 is not impaired.

The lever 40 has a pair of forwardly extending ear portions 44 and 46 having straight outer sides 48 and 50 and inwardly curved inner sides 52 and 54. The ear portions 44 and 46 are disposed at equal distances on opposite sides of the pin 42 which is located on a line substantially parallel to the control rods 28 and 30 and located midway between the rods 28 and 30. A pair of connecting links 60 and 62 are connected at their rear ends by horizontal pivots 64 to the front ends of the rods 28 and 30, respectively, so that the links 60 and 62 are movable up and down but are prevented from moving from side to side. The front end of the link 60 is connected by an upright pivot 66 to the lever member 40 at a position adjacent to and substantially in line with the straight side 48 of the ear 44. The front end of the link 62 is similarly connected by an upright pivot member 68 to the lever member 40 at a position adjacent to and in line with the straight side 50 of the ear portion 46.

The control lever 40 is connected by means of an elongated link 72 to a shift lever 70 positioned adjacent the transmission shift lever 24 at a location conveniently operable from the operator's seat 16. The rear end of the link 72 carries a bracket 74 which is connected by a pivot 76 to the lever 40 adjacent the terminal end thereof so that on reciprocation of the link 72 the lever 40 is swung fore and aft of the vehicle 12.

In the operation of the apparatus 10, assume that the lever 40 is in the position shown in Figs. 2 and 3 corresponding to a "high range" position of the control rod 28 and a "two-wheel drive" position of the control rod 30. On operation of the shift lever 70 to move the link 72 rearwardly, the control lever 40 is pivoted about the pin 66 to move the rod 30 into the "four-wheel drive" position shown in Fig. 4. The pin 66 cannot move rearwardly of the vehicle because the control rod 28 is in its inner position and therefore holds the pin 66 against rearward movement. The pin 66 cannot move forwardly because the ear 44 is adjacent the rear side of a stop member 80 secured to the supportnig plate 34. Consequently, rotation of the lever 40 must be about the pin 66 as a pivot.

On swinging movement of the control lever 40 from the Fig. 3 to the Fig. 4 positions thereof, the curved side 52 of the ear 44 moves along the rear side of the stop 80 to a position of the ear 44 to one side of the stop 80 and the pivot pin 42 moves from the forward end of the slot 38 to the rear end. In the illustrated embodiment of the invention, the stop 80 is in the form of a nut mounted on the top side of the plate 34 and having one side cut off to provide an elongated flat face 82. However, the stop 80 can take any form so long as it is located substantially in the position shown in Figs. 3 to 6 and does not interfere with rotational movement of the ear 44 and, as will appear presently, does not interfere with forward movement of the ear 44 in the Fig. 4 position thereof.

On further rearward movement of the link 72, the control lever 40 is swung in a clockwise direction about the pivot pin 68, which cannot be moved rearwardly since the rod 30 is in its innermost position. It is to be noted that during movement of the control lever 40 from the Fig. 4 position, the ear 46 is moved rearwardly to a position behind a second stop member 84, like the stop member 80. The stop members 80 and 84 are located on the plate 34 such that in the position of the lever 40 in which it is perpendicular to the rods 28 and 30 (Fig. 4), the flat sides 48 and 50 of the ears 44 and 46 are substantially parallel to and slightly rearwardly and inwardly of the elongated faces 82 on the stop members 80 and 84, respectively. Consequently, during further clockwise swinging movement of the lever 40 about the pin 68, the stop member 84 does not interfere with movement of the ear 46 to a position behind the stop 84 because of the curved shape of the side 54 of the ear 46 (Fig. 5). Also, during clockwise swinging movement of the control lever 40 in the Fig. 4 position thereof, the stop 80 does not interfere with movement of the ear 44 since the ear is inwardly of the stop member 80. The lever 40 is, therefore, readily swung about the pin 68 to the Fig. 5 position of the control lever 40 in which the control rod 28 has been moved outwardly to an intermediate "neutral" position so that a "four-wheel drive-neutral" condition of the vehicle drive mechanism is obtained. The pin 42 in this position of the control lever is intermediate the ends of the slot 38.

On continued swinging movement of the control lever 40 in a clockwise direction, the rod 28 is moved to its outermost "low range" position and the pin 42 is moved to the front end of the slot 38 (Fig. 6). Since the ear 46 is behind and substantially abuts the stop member 84, the pin 68 is prevented from moving forwardly. As a result, on swinging movement of the control lever 40 in an opposite direction, namely, a counterclockwise direction from the position shown in Fig. 6, the control lever must rotate about the pin 68 until the control lever 40 has been moved to the Fig. 4 position in which the ear 46 has been moved out from behind the stop member 84. On further movement, the lever 40 swings about the pin 66 since the control rod 28 is in its innermost position.

From the above description, it is seen that this invention provides a single lever control apparatus which is operable to manipulate the gear control rods 28 and 30 through the desired gear control positions thereof. The gear mechanism in the transfer case 26 is thus movable between a "two-wheel drive-high range" position to a "four-wheel drive-low range" position merely by manipulation of the shift lever 70. This is accomplished by mounting the control lever 40 so that it is movable about either the pivot 66 or the pivot 68 depending on its position. The ear projections 44 and 46 on the control lever 40 cooperate with the stationary stops 80 and 84 to releasably hold the pivot members 66 and 68, respectively, in the stationary positions required for operation of the control lever 40.

It will be understood that the specific construction of the improved single lever control apparatus herein disclosed and described is presented for purposes of explanation and illustration and is not intended to indicate limits of the invention, the scope of which is defined by the following claims.

What is claimed is:

1. In a vehicle having a gear housing and a pair of substantially parallel gear control rods mounted on the housing for reciprocal movement, each of said rods being movable axially thereof between inner and outer stop positions, a lever member extending transversely of and pivotally connected to the control rods, projections on spaced portions of the lever corresponding to the pivotal connections thereof to said control rods, stop members on the vehicle corresponding to said projections and arranged so that in the inner position of one rod said lever member is movable to a position in which one projection extends between the lever and one of the stop members at a position preventing outward movement of said one rod so that on swinging movement of the lever it must rotate about the pivotal connection thereof to said one rod.

2. In a vehicle having a gear housing and a pair of substantially parallel gear control rods mounted on the housing for reciprocal movement between inner and outer stop positions, a supporting plate on the vehicle, a control lever mounted on and loosely pivotally connected to the supporting plate, link members on the rods pivotally connected to longitudinally spaced portions of the control lever on opposite sides of the pivotal connection thereof to the supporting plate, a pair of ears on said control lever adjacent said spaced portions extending in a direction away from said link members, stop members on said supporting plate arranged so that in the inner stop position of each rod said lever is movable to a position in which one ear extends between the lever and a stop member at a position adjacent the pivotal connection of the link member for the rod to the lever so as to prevent outward movement of the rod, said stops also being arranged so that when the lever is moved in a direction to move a rod from its inner to its outer position, the ear adjacent the pivoted connection of the link for that rod is to one side of the stop member therefor so that the ear will not interfere with outward movement of the rod.

3. In a vehicle having a gear housing and a pair of substantially parallel gear control rods mounted on the housing for reciprocal movement between inner and outer stop positions, a supporting plate on the vehicle, a control lever mounted on and loosely pivotally connected to the supporting plate, link members on the rods pivotally connected to longitudinally spaced portions of the control lever, said control lever having a pair of ears thereon arranged adjacent said spaced portions and extending in a direction away from said link members and corresponding to said rods, stop members on said supporting plate arranged so that in the inner stop position of each rod the lever is movable to a position in which the corresponding ear extends between the lever and a stop member at a position adjacent the pivoted connection of the link member for the rod to the lever so as to prevent outward movement of the rod, said stops also being arranged so that when the lever is moved in a direction to move a rod from its inner to its outer position, the corresponding ear is to one side of the stop member therefor so that the ear will not interfere with outward movement of the rod.

4. In a vehicle having a gear housing and a pair of substantially horizontal parallel gear control rods mounted on the housing for reciprocal movement between inner and outer stop positions, a substantially horizontal supporting plate mounted on the vehicle at a position forwardly of the control rods, a substantially horizontal control lever loosely supported on the supporting plate for rotation relative thereto and for limited fore and aft movement, link members corresponding to said control rods, said link members being connected at their rear ends to said control rods and pivotally connected at their forward ends to longitudinally spaced portions of said control lever, and forwardly projecting ears on said control lever corresponding to said control rods and having outer straight sides which face in opposite directions and are in substantial alignment fore and aft of the vehicle with said pivotal connections, and stop means on the supporting plate corresponding to said ears and located so that in the inner position of each control rod said lever is movable to a position in which the ear corresponding to said control rod is disposed between the corresponding pivotal connection and stop means in a position in which the stop means stops the ear against movement in a direction in which said rod would be moved to its outer stop position.

5. In a vehicle having a gear housing and a pair of substantially horizontal parallel gear control rods mounted on the housing for reciprocal movement between inner and outer stop positions, a substantially horizontal supporting plate mounted on the vehicle at a position forwardly of the control rods, a substantially horizontal control lever loosely supported on the supporting plate for rotation relative thereto and for limited fore and aft movement, link members corresponding to said control rods, said link members being connected at their rear ends to said control rods and pivotally connected at their forward ends to longitudinally spaced portions of said control lever, and forwardly projecting ears on said control lever corresponding to said control rods and having outer straight sides which face in opposite directions and are in substantial alignment fore and aft of the vehicle with said pivotal connections and inner sides which curve inwardly from the forward ends of said straight sides toward said lever, and stop means on the supporting plate corresponding to said ears and located so that in the inner position of each control rod said lever is movable to a position in which the ear corresponding to said control rod is disposed between the corresponding pivotal connection and stop means in a position in which the stop means stops the ear against movement in a direction in which said rod would be moved to its outer stop position.

6. In a vehicle having a gear housing and a pair of substantially horizontal parallel gear control rods mounted on the housing for reciprocal movement between inner and outer stop positions, a substantially horizontal supporting plate mounted on the vehicle at a position forwardly of the control rods, a substantially horizontal control lever loosely supported on the supporting plate for rotation relative thereto and for limited fore and aft movement, means pivotally connecting the forward ends of said control rods to longitudinally spaced portions of said control lever, and forwardly projecting ears on said control lever corresponding to said control rods and having outer straight sides which face in opposite directions and are in substantial alignment fore and aft of the vehicle with said pivotal connections, and stop means on the supporting plate corresponding to said ears and located so that in the inner position of each control rod said lever is movable to a position in which the ear corresponding to said control rod is disposed between the corresponding pivotal connection and stop means in a position in which the stop means stops the ear against movement in a direction in which said rod would be moved to its outer stop positions.

7. In a vehicle having a gear housing and a pair of substantially parallel gear control rods mounted on the housing for reciprocal movement, each of said rods being movable axially thereof between inner and outer stop positions, a lever member extending transversely of the control rods and formed with longitudinally spaced ear portions, means on the vehicle movably and rotatably supporting said lever member, stop means on the vehicle engageable with portions of the lever member for confining rotational movement of said portions, and means pivotally connecting said rods to longitudinally spaced portions of said lever said lever supporting means and said ear portions being arranged relative to said stop means so that in any one position of the lever only one of said rods is reciprocatable in response to swinging movement of the lever in one direction.

References Cited in the file of this patent

UNITED STATES PATENTS

| | | |
|---|---|---|
| 2,083,715 | Kesling | June 15, 1937 |
| 2,098,708 | Maker et al. | Nov. 9, 1937 |
| 2,277,830 | Phillips | Mar. 31, 1942 |
| 2,301,816 | Rubly | Nov. 10, 1942 |
| 2,498,889 | Iavelli | Feb. 28, 1950 |